United States Patent [19]

Gabbert

[11] Patent Number: 5,507,248
[45] Date of Patent: Apr. 16, 1996

[54] NON-CLOGGING CAT LITTER SIFTING DEVICE

[76] Inventor: Virginia L. Gabbert, 505 Rancho La., Florissant, Mo. 63031

[21] Appl. No.: 303,836
[22] Filed: Sep. 9, 1994
[51] Int. Cl.⁶ ................................................ A01K 1/035
[52] U.S. Cl. .................................................... 119/166
[58] Field of Search .......................... 119/165, 166, 119/167; 209/259, 408, 355, 352

[56] References Cited

U.S. PATENT DOCUMENTS

| | | | |
|---|---|---|---|
| 3,752,120 | 8/1973 | Pallesi | 119/166 |
| 4,030,449 | 6/1977 | Ruddick et al. | 119/166 |
| 4,615,300 | 10/1986 | McDonough | 119/167 |
| 4,723,510 | 2/1988 | Skillestad | 119/167 |
| 5,325,815 | 7/1994 | Gumpesberger | 119/166 |
| 5,372,095 | 12/1994 | Dowling et al. | 119/166 |
| 5,419,282 | 5/1995 | Dennis | 119/166 |

FOREIGN PATENT DOCUMENTS 3028579  2/1982  Germany ................ 119/166

Primary Examiner—Todd E. Manahan
Attorney, Agent, or Firm—Grace J. Fishel

[57] ABSTRACT

A cat litter sifting device for use with clumping litter includes a pair of nesting pans, the inner one of which has a plurality of holes sized and spaced apart to pass unclumped litter but which trap substantially all clumped litter and fecal matter. The inner pan has uniform bottom and side walls and is closely fitted in the outer pan so that there are substantially no gaps for trapping litter between the pans.

2 Claims, 2 Drawing Sheets

NON-CLOGGING CAT LITTER SIFTING DEVICE

BACKGROUND OF THE INVENTION

1. Field of the Invention

The present invention relates to a cat litter sifting device for use with litter which clumps when wetted, allowing for physical removal of the wetted litter along with fecal matter.

2. Brief Description of the Prior Art

Cats can be trained to urinate and defecate in a specially provided litter box filled with absorbent material. The urine soaked litter can be separated from the clean litter with the fecal matter if the litter clumps when it is wetted into agglomerates that are sufficiently large and stable to be removed like feces. Litters that agglomerate when they are wetted are called clumping or scoopable litters.

If the litter is not of the clumping kind, in a few days, the urine odor will become so strong that the entire contents of the litter box must be discarded. On the other hand if the litter clumps so that the urine balls can be removed with the solid waste, the remaining litter need not be discarded. If this is done on a daily basis, the litter box can be kept sweet smelling without wasting litter, resulting in savings to the pet owner.

Some clumping litters form very well defined agglomerates that do not break apart easily. Other scoopable litters, however, form more fragile agglomerates that require very gentle handling to avoid breaking the clumps into fragments, some of which may remain behind leading to the buildup of unpleasant urine odors.

The most common tool for cleaning urine balls and feces from clumping cat litter is a perforated scoop, which when used to dig around a litter box raises a cloud of dust and may become fouled such that it must be washed. The process of scooping the litter and washing the scoop is moderately unpleasant and, while necessary for good litter box hygiene, tends to be put off so that in practice it may not be done on a daily basis.

SUMMARY OF THE INVENTION

In view of the above, it is an object of the present invention to provide an easy and effective way to remove urine balls and solid waste from scoopable cat litter in a manner that avoids breaking up the clumps, portions of which may otherwise be left behind as an undesirable contaminant. It is another object to provide a litter sifting device that does not raise a cloud of dust and is not soiled in ordinary use so that it does not require frequent washing. It is also an object to provide a cat litter sifting device, whose ease of operation promotes daily use. Other objects and features of the invention will be in part apparent and in part pointed out hereinafter.

In accordance with the invention, a cat litter sifting device for use with clumping cat litter has an inner and an outer open topped pan. The inner pan has a plurality of holes sized and spaced apart a distance to pass unclumped litter but which trap substantially all solid and liquid waste clumps formed by a cat using the device as a relief station. The inner pan has a bottom and side walls of uniform thickness and is closely nested in the outer pan so that there are substantially no gaps for trapping litter between the pans and so that the amount of litter in the holes is minimal when the pans are nested.

The invention summarized above comprises the constructions hereinafter described, the scope of the invention being indicated by the subjoined claims.

BRIEF DESCRIPTION OF THE DRAWINGS

In the accompanying drawings, in which one of various possible embodiments of the invention are illustrated, corresponding reference characters refer to corresponding parts throughout the several views of the drawings in which.

DETAILED DESCRIPTION OF THE INVENTION

Figure 1:
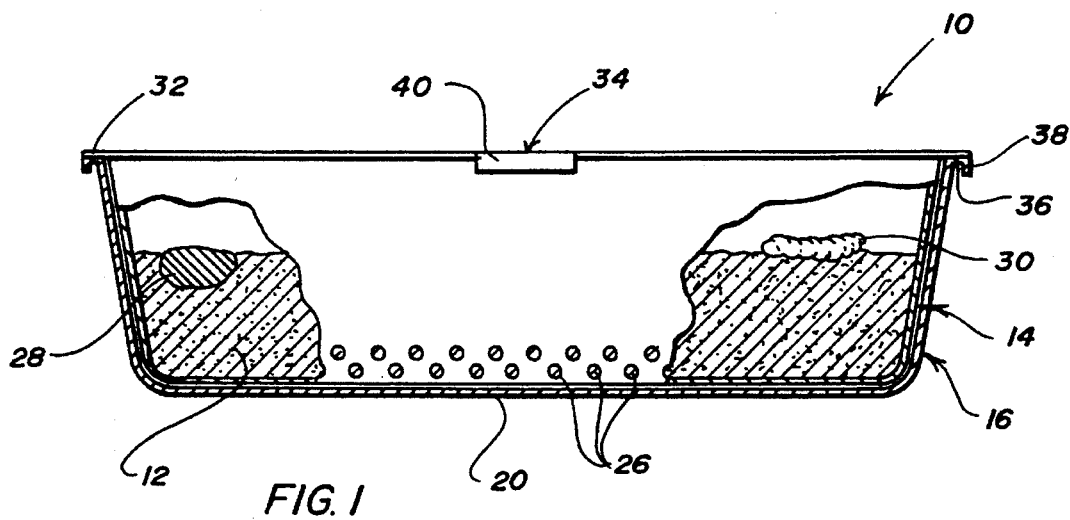
FIG. 1 is a side elevation partly in section of a cat litter sifting device in accordance with the present invention, said device having nesting inner and outer pans wherein the inner pan is perforated.

Referring to the drawings more particularly by reference character, reference numeral 10 refers to a cat litter sifting device in accordance with the present invention. Device 10 is for use with a clumping cat litter 12. Such litters need not be thrown out because of the development of odor if solid and liquid waste clumps are removed at frequent intervals, preferably daily.

Device 10 includes inner and outer open topped pans 14, 16, respectively, preferably, but not necessarily, made of plastic. As shown in FIG. 1, inner pan 14 nests flush in outer pan 16 to keep litter 12 from draining into outer pan 16, until inner pan 14 is raised. This keeps the litter from agglomerating between the pans and sticking to the inside of outer pan 16. Pans 14, 16 may be rectangular in shape, about 16 inches wide by 20 inches long and about 8 inches deep, with bottom walls 18, 20, respectively, and outwardly flared side walls 22, 24, respectively. In this form, device 10 looks like an ordinary litter box when assembled as shown in FIG. 1 so that a cat will not hesitate to use it. Pans 14, 16 may be sold as a unit or separately and inner pan 14 may be provided as a liner for already existing outer pans 16.

Figure 2:
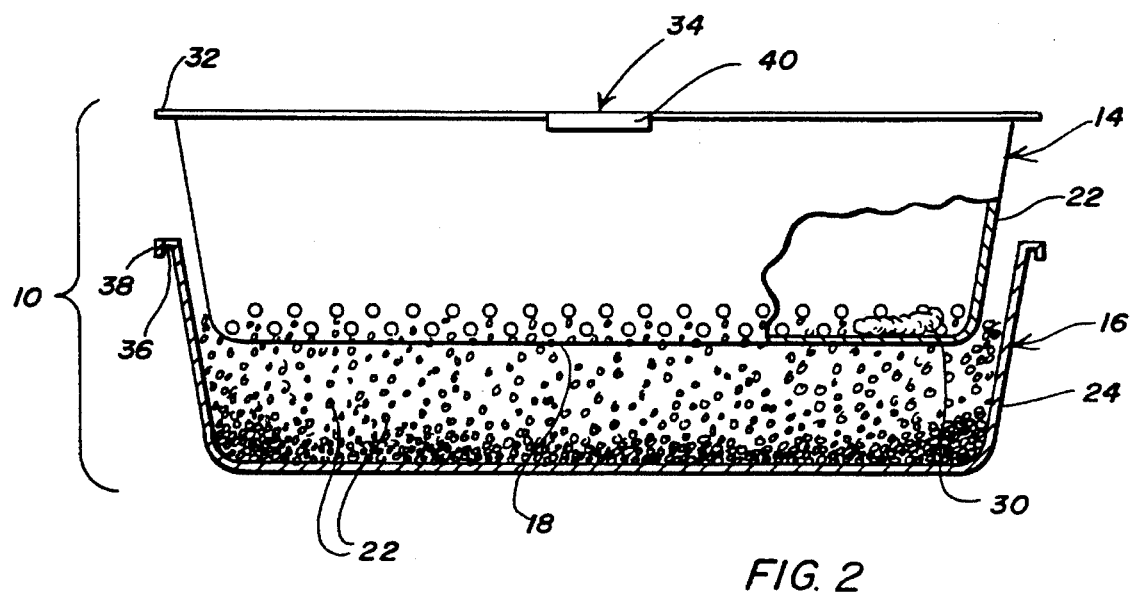
FIG. 2 is a side elevation partly in section of the device wherein the inner pan is shown sifting the cat litter as it is lifted from the outer pan.
Figure 3:
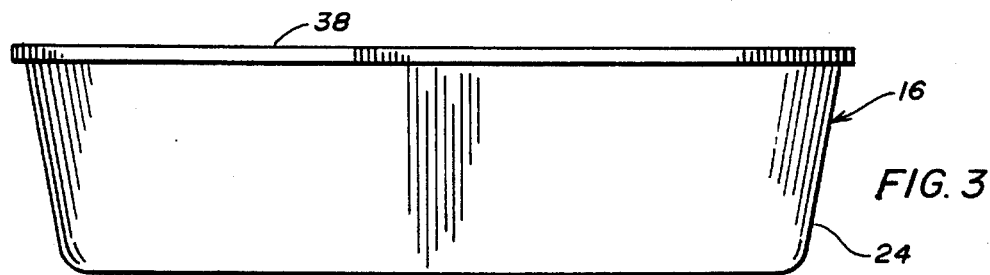
FIG. 3 is a side elevation of the outer pan.
Figure 4:
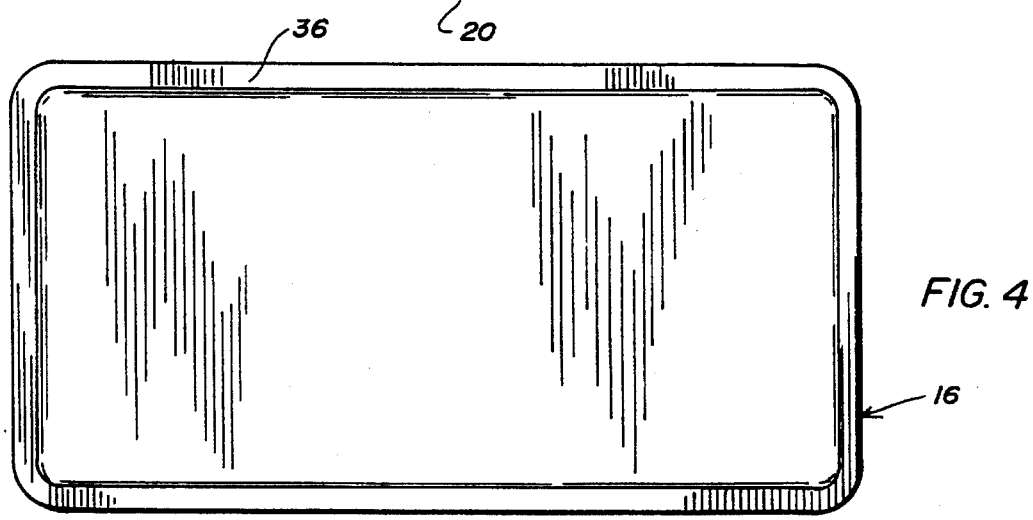
FIG. 4 is a top plan view of the outer pan.
Figure 5:
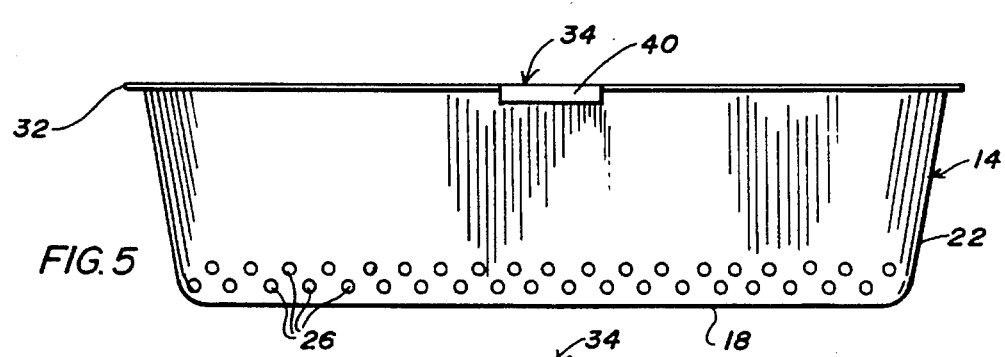
FIG. 5 is a side elevation of the inner pan.
Figure 6:
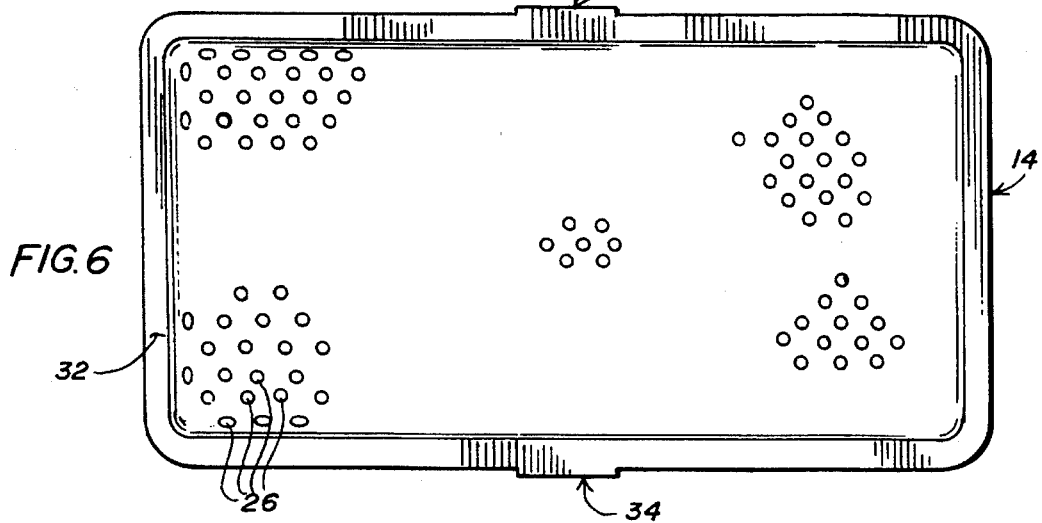
FIG. 6 is top plan view of the inner pan.

Bottom wall 18 and side walls 22 of inner pan 14 are substantially uniform in thickness and are preferably no greater than about ¼ inch thick, more preferably no greater than about ⅛ inch thick. A plurality of holes 26, preferably generally circular, are provided in bottom 18 of inner pan 14 and, in the embodiment shown in the drawings, are also provided in side walls 22 for a short distance up the walls (e.g., no more than about 2 inches above bottom wall 18) so that the litter will not spill out when the inner pan is used as a sifter. Holes 26 are spaced apart the width of the holes and are sized such that the litter will drain out when inner pan 14 is lifted as shown in FIG. 2 while retaining urine balls 28 and fecal matter 30 on bottom 18 of inner pan 14. The holes 26 in side walls 22 allow for quicker sifting of the litter.

With small grain clumping cat litter formed from clay, holes 26 should be about 3/16 inch in diameter, spaced about 3/16 inch apart, whereas with pellet clumping cat litter formed from paper, organics, etc., holes 26 should be about ¼ inch in diameter, spaced about ¼ inch apart. It will be understood that the foregoing dimensions for holes 26 are stated for the purpose of satisfying disclosure requirements and not intended to be limiting. Moreover, while the full benefits of the present invention (regarding conservation of litter and avoiding urine odor) are only enjoyed with clumping cat litters, it will be appreciated that device 10 can be used with other litters that can be easily sifted through holes 26 such as sand, pea gravel and so forth.

For ease of use, an outwardly flared flange 32 is formed around the top edge of side walls 22 of inner pan 14. Flange 32 includes opposing enlarged portions for use as handholds 34, for best balance midway the long axis of the rectangular pan. Handholds along the short axis are not preferred. As shown in the drawings, outer pan 16 also includes an outwardly flared flange 36, said flange 36 having a downwardly extending lip 38. Flange 32 of inner pan 14 overlies flange 36 of outer pan 16 when the pans are nested as shown in FIG. 1. As further shown, handholds 34 include a downwardly extending lip 40 which nests over lip 38. In the form illustrated, nothing sticks up above nested flanges 32, 36 so that a cat can perch on the edge of the litter pan in the usual manner.

In use, inner pan 14 is nested in outer pan 16 with bottom 18 and side walls 22 of inner pan 14 flush with bottom 20 and side walls 24 of outer pan 16. The fit between the pans must be sufficiently snug so that substantially no litter is trapped between the pans. Inner pan 14 is then filled with a clumping cat litter to a depth in accordance with the manufacturer's specifications, typically in the range of 2 to 4 inches and preferably to a level above holes 26 (if any) in side walls 22. Because of the close fit between inner and outer pans 14, 16, substantially no litter will be between the pans and a very thin plug of litter will be in holes 26 because of the minimal thickness of bottom and side walls 18, 22.

After a cat has used device 10 as a relief station, the clumpable litter can be cleaned by simply lifting inner pan 14 by its handholds 34, during which operation the litter will sift through holes 26 and fall into outer pan 16. After the litter has been sifted, all solid and liquid waste clumps may be dumped into a proper receiver as, for example, by placing inner pan 14 in a trash bag and inverting the pan. Holes 26 do not tend to clog since the litter in the hole, if wetted by urine, is not thick enough to form a hard plug and, if clogged, may be easily opened by tapping on inner pan 14. The sifted litter is then transferred from outer pan 16 to a third litter pan or some other container with no litter sticking to bottom 20 and side walls 24 of outer pan 16, obviating the need to wash the outer pan. Inner pan 14 is then reinstailed in outer pan 16, the old litter poured back into device 10 from the container in which it has been temporarily stored and fresh litter added to bring the litter up to the appropriate level. The whole operation can be accomplished without raising a cloud of dust, an important consideration for those with dust sensitivity.

As will be appreciated, the ease with which device 10 can be used promotes frequent sifting of the litter, thus extending the useful life of the litter without the development of offensive odors and conserving resources.

In view of the above, it will be seen that the several objects of the invention are achieved and other advantageous results attained. As various changes could be made in the above construction without departing from the scope of the invention, it is intended that all matter contained in the above description or shown in the accompanying drawings shall be interpreted as illustrative and not in a limiting sense.

What is claimed:

1. A cat litter sifting device for use with clumping cat litter comprising inner and outer rectangular open topped rigid pans, said inner and outer pans each having a bottom and outwardly flared side walls, a long and a short axis and outwardly flared flanges along a top edge of the side walls with the flange on the inner pan overlying the flange on the outer pan when the pans are nested, said inner pan having handholds formed in the flange midway of its long axis, said outer pan being imperforate, said inner pan having a plurality of holes in its bottom and partly up its side walls that are sized and spaced apart a distance to pass unclumped litter but which trap substantially all solid and liquid waste clumps formed by a cat using the device as a relief station, said holes being substantially evenly spaced apart. a distance equal to the width: of the holes, said bottom and side walls of said inner pan being of a substantially uniform thickness of between about ⅛ and ¼ inch that nest flush with the bottom and side walls of the outer pan so that there are substantially no gaps for trapping litter between the pans and so that the amount of litter in the holes is minimal.

2. The device of claim 1 wherein the holes are generally circular and have a diameter between about ¼ and 3/16 inch.

* * * * *